United States Patent [19]
Iida

[11] Patent Number: 5,547,078
[45] Date of Patent: Aug. 20, 1996

[54] HOUSING FOR ACCOMMODATING ONE OR MORE DISKS

[76] Inventor: Yoshiaki Iida, 3-12, Myokenhigashi 3-chome, Katano-shi, Osaka 576, Japan

[21] Appl. No.: 335,533

[22] Filed: Nov. 7, 1994

[51] Int. Cl.⁶ .................................................. B65D 85/57
[52] U.S. Cl. ................... 206/308.1; 206/309; 312/9.58; 312/9.42
[58] Field of Search ................................ 206/308.1, 309, 206/312, 387.12; 312/9.9, 9.11, 9.27, 9.28, 9.41, 9.42, 9.45, 9.58, 9.61

[56] References Cited

U.S. PATENT DOCUMENTS

| | | | |
|---|---|---|---|
| 3,051,537 | 8/1962 | Diehl et al. | 312/9.42 |
| 3,389,942 | 6/1968 | Jacob | 312/9.41 |
| 4,054,344 | 10/1977 | Fujimoto et al. | 312/9.42 |
| 4,401,220 | 8/1983 | Kim | 312/9.41 |
| 4,875,743 | 10/1989 | Gelardi et al. | 206/309 |
| 5,232,275 | 8/1993 | Yamazoe | 312/9.58 |
| 5,244,084 | 9/1993 | Chan | 206/308.1 |

FOREIGN PATENT DOCUMENTS

| | | | |
|---|---|---|---|
| 2272413 | 12/1975 | France | 312/9.42 |
| 1206979 | 9/1986 | Japan | 206/308.1 |

*Primary Examiner*—David T. Fidei
*Attorney, Agent, or Firm*—Jordan and Hamburg

[57] ABSTRACT

A housing for accommodating at least one disk-shaped recording medium such as an optical disk includes at least one holder having means for holding a recording medium. At least one cover is arranged closely adjacent the holder in parallel relationship such that the covers alternate with the holders so that one end face is made up of a holder, on which an end plate is mounted. A first fastener means is received in openings provided in the holders, covers and end plate. A second fastener means is received in another openings provided in the covers and end plate.

9 Claims, 4 Drawing Sheets

HOUSING FOR ACCOMMODATING ONE OR MORE DISKS

BACKGROUND OF THE INVENTION

1. Field of the Invention

The present invention relates to a housing for accommodating one or more rigid, disk-shaped recording media typified by optical disks such as video disks and compact disks.

2. Description of the Prior Art

Various types of optical disks such as read-only optical disks, write-once optical disks and erasable type optical disks are in general use.

Since the surfaces of an optical disk bruise and soil easily, it is most common to accommodate the optical disk in a housing when the optical disk is to be stored or carried.

Japanese Laid Open Utility Model Application No. 61-170178 describes a housing comprising a holder for superposing an optical disk thereon and a cover adapted to be placed over the holder. The center hole of the optical disk is adapted to receive a lug carried by the inner surface of the holder. In order to store a plurality of optical disks, a plurality of such housings respectively accommodating the optical disks are stacked tier upon tier or allowed to stand one behind another. For retrieving an optical disk, a housing in which the desired optical disk is accommodated has to be found. When it has been found, the cover has to be pivoted into an opened position so that the desired optical disk may be taken out. Such a complication arising from the use of this housing constitutes a drawback which limits its utility.

Japanese Laid Open Patent Application No. 5-205431 also describes a housing comprising a first member and a second member, whereof each has a recess alignable with the recess of the other to receive diametrically opposite end portions of an optical disk. Either of the two members may be provided with means for holding the optical disk. The first and second members are pivotally joined to each other so that either of them may be subjected to swing motion relative to the other in a plane parallel with the surfaces of the optical disk accommodated in the housing. In theory, such a construction of the first member relative to the second member makes it feasible to retrieve an optical disk from among a plurality of optical disks respectively accommodated in the housings and allowed to stand one behind another. In fact, however, the construction of this prior art housing does not presuppose that a plurality of housings respectively accommodating the optical disks are stacked tier upon tier or allowed to stand one behind another but presupposes that each housing is stored independently of others.

Japanese Utility Model Examined Publication No. 5-14367 describes an apparatus for storing a plurality of optical disks. This apparatus includes a housing for accommodating a plurality of open topped holders, each of which is capable of holding a single optical disk. The optical disk has to be moved in its axial direction when it is to be placed into or released from a holder. This apparatus was designed for use with an automatic disk changer and has the disadvantage that too much space is occupied if this apparatus is used for storing a plurality of optical disks.

SUMMARY OF THE INVENTION

In view of the above-described problems, the primary object of the invention is to provide a housing for accommodating one or more rigid, disk-shaped recordig media of the kind referred to (hereinafter called the "disks" for short) and in accordance therewith, the housing is made up of or comprises a plurality of holders for holding the disks, said holders being arranged closely adjacent one another in parallel relationship in such a manner as to require less space and yet allow a specific holder to be easily retrieved.

In one described embodiment, the housing includes a plurality of disk holding assemblies, each of which includes a holder for holding a disk and a cover adapted to engage one side of the holder. Thus a plurality of disk holding assemblies in accordance with the present invention comprise holders alternating with covers so that one end face of a set of disk holding assemblies may be made up of a holder, on which an end plate is mounted. The holders, covers and end plate are operatively held in engagement with each other by means of first fastener means. Furthermore, the covers and the end plate are held in place relative to each other by second fastener means and third fastener means. Each holder can be swung about the first fastener means so as to allow a specific disk to be retrieved from a specific holder.

Preferably, each fastener means comprises a male screw, one or more intermediate screws and a female screw. The construction of the joints permits the fastener means to be assembled in any desired length according to the desired number of disk holding assemblies of which a housing in accordance with the present invention is to be made up.

In brief, an important feature of the present invention is that each pair of adjacent holders are partitioned by means of a cover, with the end plate mounted only on one end face of a plurality of disk holding assemblies. Thus the foregoing object of providing a housing which requires less space is attained.

For the purpose of neat pigeonholing of the disks, each combination of a holder and a cover may be colored differently from others.

DETAILED DESCRIPTION OF THE PREFERRED EMBODIMENTS

Figure 1:
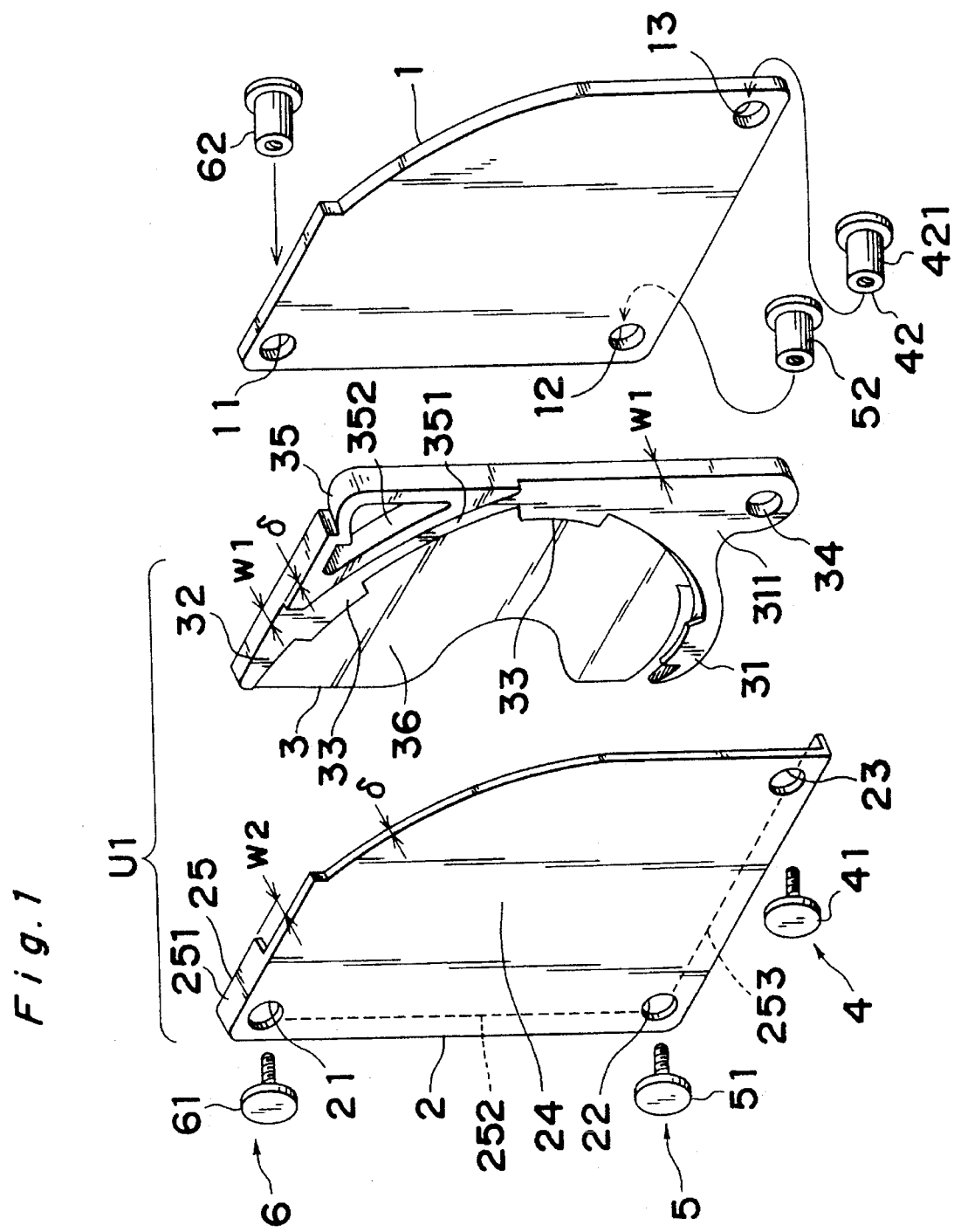
FIG. 1 is an exploded perspective view of the housing in accordance with the present invention, with the cover and the end plate shown removed from the holder.

FIG. 1 shows a housing in accordance with the present invention which is simplest in construction, including only a single disk holding assembly U1 which includes a holder 3 and a cover 2 adapted to engage one side of the holder 3. An end plate 1 is adapted to be mounted on the other side of the holder 3.

The holder 3 includes a semi-circular portion adapted to be arranged about the rim of a disk. The curvature of the semi-circular portion is such that, when unrestrained, end portions 31 and 32 of the semi-circular portion will slightly converge. However, when a disk engages the semicircular portion and the resilient lower end portion 31 is thereby downwardly depressed while the rigid upper end portion 32 remains free of displacement, the end portions 31 and 32 will be slightly spread in opposition to the natural bias of the resilient lower end portion 31, thereby causing the disk to be tightly held. The semi-circular portion is provided radially internally with a tongue or the like 36 which, together with a plurality of likewise radially internally extending jaw blades 33, is adapted to constitute a clip designed to engage the disk. The thickness W1 of the holder B is slightly larger than the thickness of the disk, and yet the increased thickness of the holder 3 due to the provision of the jaw blades 33 and the tongue 36 is maintained within acceptable limit.

An extension lip having a thckness of W1 radially outwardly extends from the semi-circular portion. The lower end portion 311 of the extension lip is provided with an opening 34 to receive first fastener means as will appear hereinafter. The extension lip is further provided with a vertical edge as well as a flat top surface. A finger-grip 35 is provided at the juncture of the vertical edge and the flat top surface. The finger-grip 35 is thicker by δ than the remaining portion of the extension lip having a thickness of W1. This difference δ in thickness, which is equivalent to the thickness of the cover 2, allows an arcuate shoulder surface 351 to be formed. The shoulder surface 351 faces radially inwardly of the semi-circular portion toward its center of curvature so as to be adapted to engage the corresponding edge of the cover 2 which is contoured in conformity with this arcuate shoulder surface 351. A triangular opening 352 provided in the finger-grip 35 facilitates pinching the finger-grip 35.

Figure 2:
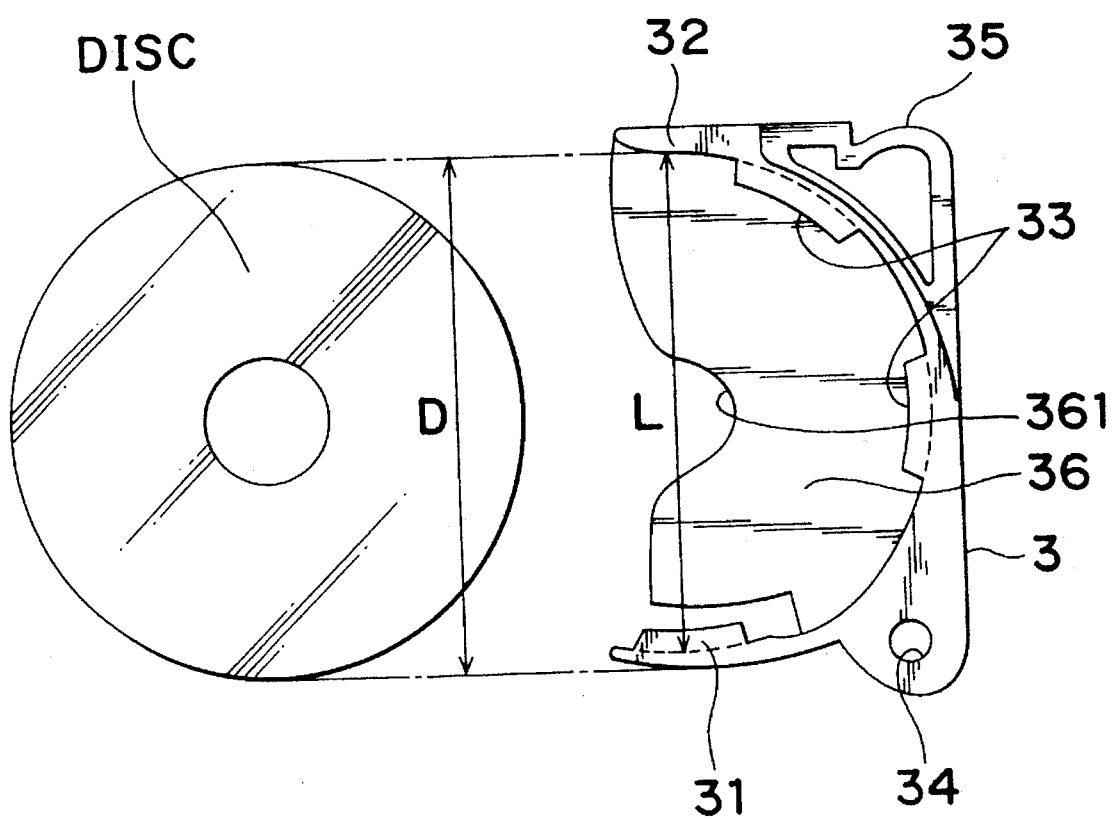
FIG. 2 is a side view of the holder, into which a disk is being stuffed.

FIG. 2 shows the holder 3 in an unrestrained state in which the distance L from the rigid upper end portion 32 of the semi-circular portion to the resilient lower end portion 31 thereof is slightly smaller than the outer diameter D of the disk. The resilient lower end portion 31 will be downwardly depressed when the disk is stuffed into the holder 3 to such an extent that the rim of the disk abuts against the semi-circular portion. The tongue 36 and the jaw blades 33 will serve to make the disk backlash-free in its axial directions. When the disk is in this position, a recess 361 provided in the tongue 36 inwardly from the free edge thereof is in alignment with the center hole of the disk so that a middle finger or index finger of a person who wishes to take out the disk may be adapted for insertion through both the recess 361 and the center hole of the disk.

Referring now again to FIG. 1, the cover 2 includes a web 24 having a laterally projecting flange 25 extending substantially at right angles thereto. The flange 25 comprises a pair of vertically spaced parallel portions 251 and 253 and another portion 252 extending from the vertical edge of the web 24. An edge of the portion 251 is substantially perpendicular to the web 24 and is adapted to engage the corresponding edge of the flat top surface of the holder 3. The depth W2 of the flange 25 is preferably selected to be equal to, or slightly larger than, the thickness W1 of the holder 3 so that, after assembly of the housing, the holder 3 can be subjected to swing motion relative to the cover 2 in a plane parallel with the surfaces of the web 24. The swing motion of the holder 3 is facilitated also by the facts that the lower end portion 311 of the holder 3 terminates in an eyelet which includes the aforesaid opening 34 and that the peripheral surface of this eyelet and the upper surface of the lower portion 253 of the flange 25 are in surface contact at a constant contact pressure even when the holder 3 is swung about the first fastener means received in the opening 34.

A portion of the edges of the web 24 is not provided with the laterally projecting flange 25 but is contoured in conformity with the arcuate shoulder surface 351 of the holder 3. Two openings 21 and 23 are respectively positioned at diagonal corners of the web 24. Another opening 22 is positioned at the juncture of the vertical edge and the lower edge of the web 24.

The end plate 1 is contoured in conformity with the web 24. Consequently, three edge portions of the end plate 1 is adapted to engage the flange 25 so as to define a space for accommodating the holder 3. Openings 11, 12 and 13 are provided in the end plate 1 such that they are respectively in alignment with the openings 21, 22 and 23.

The end plate 1, holder 3 and cover 2 are operatively held in engagement with each other by means of the first fastener means 4, about which the holder 3 can be swung. In case of the simplest construction shown in FIG. 1, the first fastener means 4 comprises a male screw 41 and a female screw 42 having a shank 421 adapted to be received in the openings 13, 34 and 23 for allowing the holder 3 to be swung thereabout.

The end plate 1 and the cover 2 are held in place relative to each other by second fastener means 5 and third fastener means 6. By virtue of the adequate positioning of the openings 11 and 21, the passage of a disk associated with the holder 3 during the swing motion thereof will not be hindered by the third fastener means 6 received in the openings 11 and 21. In case of the simplest construction shown in FIG. 1, the second fastener means 5 comprises a male screw 51 and a female screw 52, and the third fastener means 6 comprises a male screw 61 and a female screw 62. When the male screws 51 and 61 are threaded into the female screws 52 and 62 respectively, they tend to move the end plate 1 and the cover 2 toward each other and to bring the free edge of the flange 25 into tight engagement with the end plate 1.

Figure 3:
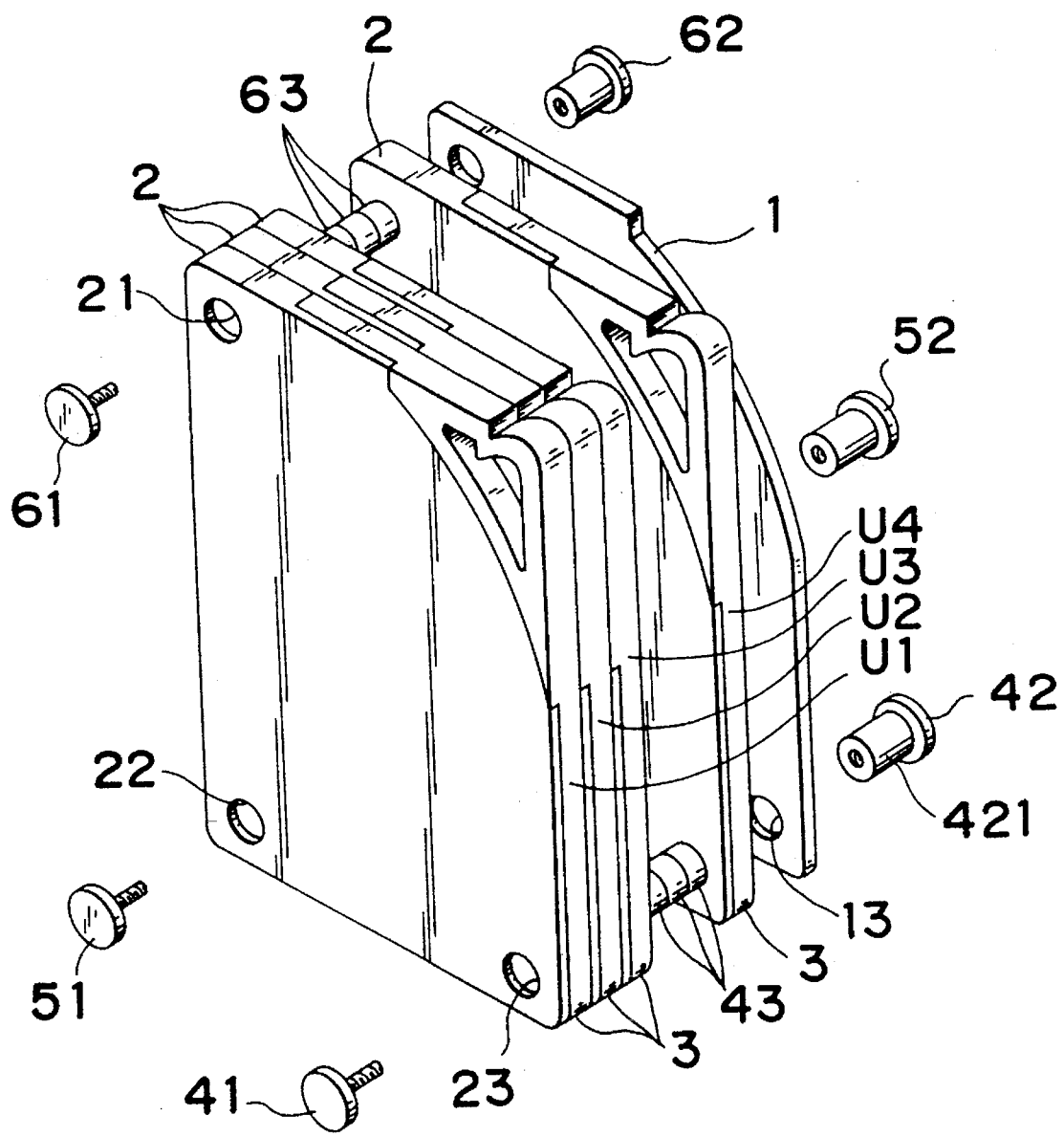
FIG. 3 is a perspective view of a plurality of disk holding assemblies in accordance with the present invention comprising holders alternating with covers so that one end face of a set of disk holding assemblies may be made up of a holder, on which an end plate is mounted.

In the embodiment of FIG. 3, as distinguished from that of FIG. 1, a housing in accordance with the present invention includes four disk holding assemblies U1 to U4 such that holders 3 alternate with covers 2 so that one end face of a set of disk holding assemblies maybe made up of a holder 3, on which an end plate 1 is mounted. Thus, irrespective of the number of disk holding assemblies used, a single end plate 1 per set of disk holding assemblies is enough.

An important feature of this embodiment is that intermediate screws are interposed between the male screw and the female screw of each fastener means so as to permit each fastener means to be assembled in any desired length according to the number of disk holding assemblies used. In FIG. 3, only the intermediate screws 43 and 63 pertaining respectively to the first and third fastener means 4 and 6 have been shown. The outer diameter of each intermediate screw 43 is equal to the outer diameter of the shank 421 of the female screw 42. Each intermediate screw 43 has a threaded part adapted to be threaded into a tapped hole in an adjacent intermediate screw 43 or the female screw 42. The male screw 41 is threaded into a tapped hole in an intermediate screw 43 disposed at one end of the jointed first fastener means 4. The axial length of each intermediate screw 43 or 63 is equal to the sum of the depth W2 of the flange 25 and the thickness δ of the web 24. In other words, the axial length of each intermediate screw 43 or 63 is equal to the thickness of a single disk holding assembly.

Positional relationship between the covers 2 and the holders 3 shown in FIG. 3 is such that the arcuate shoulder surface 351 of each holder 3 engages the corresponding edge of each cover 2 which is contoured in conformity with the arcuate shoulder surface 351 of the holder 3. Thus, each holder 3 and each cover 2 are so formed and dimensioned that, in the above-described positional relationship between the covers 2 and the holders 3, the interior of the housing is sealed off from the outside. In order to prevent any one of the holders 3 from spontaneously swinging out, either of the two members constituting each disk holding assembly may be provided with a detent or dowel adapted to fit into a keeper socket provided in the other of the two members.

Figure 4:
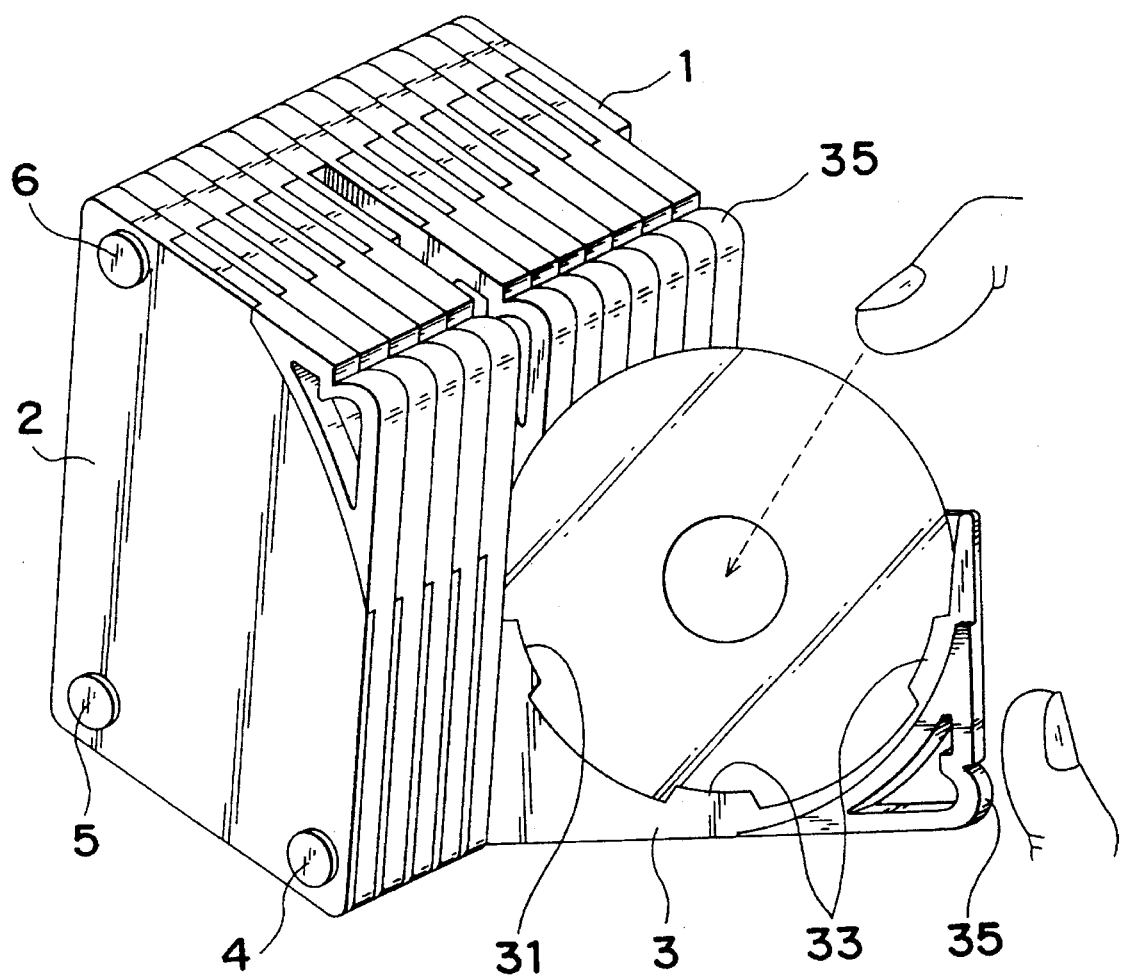
FIG. 4 is a perspective view to help explain how a specific disk is retrieved from a specific holder.

A person who wishes to place a disk into or release it from a specific holder 3 has only to tighten his finger on the finger-grip 35 of the holder 3 and pull it backward so as to swing it about the first fastener means 4 as shown in FIG. 4. He can insert his finger through the center hole of the disk so that he may not let the disk fall or slip through his fingers. The foregoing holds good also for the housing shown in FIG. 1.

By virtue of the simple construction of the fastener means shown in FIG. 3, various changes in the number of disk holding assemblies can be easily made, and only simple manipulations are required to carry out the assembling work.

The construction of the housing shown in FIGS. 3 and 4 is such that the holders 3 are maintained in separated relationship only by the covers 2. Thus the housing in accordance with the present invention requires less space than a set of prior art housings equal in number to the disk holding assemblies constituting the housing in accordance with the present invention. As compared with the prior art housings which have been designed to be carried severally and each of which is merely capable of holding a single disk, a set of disk holding assemblies interconnected by the fastener means 4, 5 and 6 so as to constitute a housing in accordance with the present invention is handy to carry.

For the purpose of neat pigeonholing of the disks, each disk holding assembly may be colored differently from others.

It is known to load a recorder-player with a cartridge containing a housing in which an optical disk is accommodated in such a manner as to permit recording and playback. It is contemplated that the housing in accordance with the present invention will be found equally advantageous when used in such a cartridge. The housing in accordance with the present invention is also adapted for use in connection with an automatic disk changer.

I claim:

1. A housing for accommodating at least one disk-shaped recording medium including an optical disk, comprising:

holder means, each for holding said recording medium and for receiving and releasing said recording medium along a path of travel in a radial direction of the recording medium;

said holder means each having a holder thickness in a direction perpendicular to a plane of the recording medium at least equal to a thickness of said recording medium and each of said holder means defining a holder fastener hole;

cover means, each for covering a first side of a respective one of said holder means whereat said recording medium is exposed;

said cover means each having a web side for covering said exposed recording medium and a peripheral flange projecting substantially perpendicularly therefrom having a flange depth at least equal to said holder thickness for accepting said holder means within an enclosure area defined by said peripheral flange and said web side;

said holder means and said cover means being arranged in an alternating stacked configuration in an assembly wherein said holder means are held within said cover means, said web sides of said cover means form partitions between said holder means, said holder means and said cover means define an interior area for accepting said recording medium, and said peripheral flanges of said cover means abut one another so that one end face of said assembly is one of said holder means and a second end face is one of said cover means;

said cover means each defining a fastener hole in alignment with said holder fastener holes for accepting a fastener about which said holder means are pivotable;

each of said peripheral flanges having first and second ends defining an opening for said holder means to pass therethrough in said radial direction between an opened position for accepting said recording medium to a closed position within said enclosure area;

said holder means each having an edge flange including a grip portion on a top surface of said holder means, said edge flange having an end abutting one of said first and second ends of said peripheral flanges when in holder means is in said closed position;

an end plate mounted on said one end face;

first fastener means for releasably coupling varying numbers of said holder and cover means together received in said holder fastener holes and said fastener holes of said cover means and coupled to said end plate; and second fastener means for releasably coupling together varying numbers of said cover means, said second fastener means being received in other holes provided in said cover means and said end plate in alignment with each other, said other holes being disposed such that a passage of said recording medium associated with one of said holder means during pivoting about said first fastener means is not hindered by said second fastener means.

2. A housing as defined in claim 1, wherein each of said holder means includes:

a semi-circular portion configured to accept a circumference of said recording medium;

said semi-circular portion having a rigid upper arm and a resiliently displaceable lower arm for accepting said recording medium therebetween;

said semi-circular portion having a curvature such that, when unrestrained, end portions of said upper and lower arms converge to a distance apart less than an outer diameter of said recording medium so that when said recording medium engages said semi-circular portion, said end portions are spread in opposition to a natural bias of said lower arm thereby causing said recording medium to be tightly held;

each of said holder means having a holder panel interposed between said upper and lower arms at a position adjacent that of said recording medium as held in said holding means and at a side of said holding means opposite that of said cover means accepting said holding means; and said semi-circular portion further including retaining flanges disposed thereon on a side opposite that of said holder panel to secure said recording medium between said retaining flanges and said holder panel.

3. A housing as defined in claim 2, wherein:

said edge flange extends along an upper edge and a vertical edge of said holder means, said grip portion is disposed proximate a corner defined by an intersection of said upper edge and said vertical edge, and a lower end of said edge flange at said vertical edge incorporates said holder fastener hole;

said end plate and cover means having substantially rectangular contours with the exception of a rounded-off corner exposing said grip portion of said edge flange when said holder means is in a closed position.

4. A housing for holding a disk-shaped recording medium, comprising:

holder means for holding said recording medium and for receiving and releasing said recording medium along a path of travel in a radial direction of the recording medium;

each of said holder means defining a holder fastener hole;

cover means, each for covering a first side of a respective one of said holder means whereat said recording medium is exposed;

said cover means each having a web side for covering said exposed recording medium and a peripheral flange projecting substantially perpendicularly therefrom for accepting said holder means within an enclosure area defined by said peripheral flange and said web side;

said holder means and said cover means being arranged in an alternating stacked configuration forming an assembly wherein said holder means are held within said cover means, said web sides of said cover means form partitions between said holder means, said holder means and said cover means define an interior area for accepting said recording medium, and said peripheral flanges of said cover means abut one another so that one end face of said assembly is one of said holder means and a second end face is one of said cover means;

said cover means each defining a fastener hole in alignment with said holder fastener holes for accepting a fastener about which said holder means are pivotable;

said cover means further defining other fastener holes for coupling together said cover means;

an end plate mounted on said one end face and defining fastener holes therein;

first fastener means for releasably coupling varying numbers of said holder and cover means together received in said holder fastener holes and said fastener holes of said cover means and coupled to said end plate;

second fastener means for releasably coupling together varying numbers of said cover means, said second fastener means being received in said other fastener holes provided in said cover means and said end plate in alignment with each other, said other holes being disposed such that a passage of said recording medium associated with one of said holder means during pivoting about said first fastener means is not hindered by said second fastener means;

said holder means each having an edge flange including a grip portion at a juncture of an upper edge and a vertical edge of said holder means, said holder fastener hole which receives said first fastener means being provided in a lower end portion of said vertical edge;

said peripheral flange extending around a perimeter of said cover means from a first flange end to a second flange end, said first and second flange end defining a flangeless portion ranging from an end of said edge flange at said upper edge to a point corresponding to said lower end portion of said vertical edge, said peripheral flange having a depth equal to a thickness of said at least one holder;

said grip portion being disposed proximate a corner defined by an intersection of said upper edge and said vertical edge, and a lower end of said edge flange at said vertical edge incorporating said holder fastener hole;

said end plate and cover means having substantially rectangular contours with the exception of a rounded-off corner exposing said grip portion of said edge flange when said holder means is in a closed position; and said edge flange having an end abutting one of said first and second ends of said peripheral flanges when in holder means is in said closed position.

5. A housing as defined in claim 4, wherein said holder means includes:

a semi-circular portion configured to accept a circumference of said recording medium;

said semi-circular portion having a rigid upper arm and a resiliently displaceable lower arm for accepting said recording medium therebetween;

said semi-circular portion having a curvature such that, when unrestrained, end portions of said upper and lower arms converge to a distance apart less than an outer diameter of said recording medium so that when said recording medium engages said semi-circular portion, said end portions being spread in opposition to a natural bias of said lower arm thereby tightly holding said recording medium.

6. A housing as defined in claim 5, wherein said holder means further include said horizontal edge of said edge flange having a flat top surface extending horizontally from on an upper end of said semi-circular portion, said vertical edge extending vertically tangent to said semi-circular portion, and said grip being provided at a juncture of said vertical edge and said flat top surface.

7. The housing according to claim 1 wherein each of said fastener means comprise:

a male fastener having an externally threaded shank;

a female fastener having a shank defining an internally threaded hole for accepting said threaded shank; and intermediate fasteners having both a shank defining an internally threaded hole and an externally threaded shank for coupling with said male and female fasteners respectively, said intermediate fasteners having a shank diameter equal to a shank diameter of said female fastener and an axial length at least equal to said depth of said peripheral flange of said cover means.

8. The housing according to claim 3 wherein each of said fastener means comprise:

a male fastener having an externally threaded shank;

a female fastener having a shank defining an internally threaded hole for accepting said threaded shank; and intermediate fasteners having both a shank defining an internally threaded hole and an externally threaded shank for coupling with said male and female fasteners respectively, said intermediate fasteners having a shank diameter equal to a shank diameter of said female fastener and an axial length at least equal to said depth of said peripheral flange of said cover means.

9. A housing for holding a disk-shaped recording medium, comprising:

a holder means for holding said recording medium and for receiving and releasing said recording medium along a path of travel in a radial direction of the recording medium;

said holder means defining a holder fastener hole;

a cover means for covering a first side of said holder means whereat said recording medium is exposed;

said cover means having a web side for covering said exposed recording medium and a peripheral flange projecting substantially perpendicularly therefrom for accepting said holder means within an enclosure area defined by said peripheral flange and said web side;

said holder means and said cover means being arranged in an assembly wherein said holder means are held within said cover means, and said holder means and said cover means define an interior area for accepting said recording medium;

said cover means each defining a fastener hole in alignment with said holder fastener hole for accepting a fastener about which said holder means is pivotable;

an end plate contoured in conformance with said peripheral flange of said cover means and defining fastener holes therein;

said cover means further defining other fastener holes for coupling together said cover means and said end plate;

first fastener means for releasably coupling said holder and cover means together received in said holder fastener holes and said fastener holes of said cover means and coupled to said end plate;

second fastener means for releasably coupling together said cover means and said end plate, said second fastener means being received in said other fastener holes provided in said cover means and said end plate in alignment with each other, said other holes being disposed such that a passage of said recording medium from said holder means during pivoting about said first fastener means is not hindered by said second fastener means;

said holder means having an edge flange including a grip portion at a juncture of an upper edge and a vertical edge of said holder means, said holder fastener hole which receives said first fastener means being provided in a lower end portion of said vertical edge;

said peripheral flange extending around a perimeter of said cover means from a first flange end to a second flange end, said first and second flange end defining a flangeless portion ranging from an end of said edge flange at said upper edge to a point corresponding to said lower end portion of said vertical edge, said peripheral flange having a depth equal to a thickness of said holder means;

said grip portion being disposed proximate a corner defined by an intersection of said upper edge and said vertical edge, and a lower end of said edge flange at said vertical edge incorporating said holder fastener hole;

said end plate and cover means having substantially rectangular contours with the exception of a rounded-off corner exposing said grip portion of said edge flange when said holder means is in a closed position; and said edge flange having an end abutting one of said first and second ends of said peripheral flanges when in holder means is in said dosed position.

* * * * *